Dec. 20, 1960 J. W. DICKEY 2,964,940
FUEL CONSUMPTION METER FOR AUTOMOTIVE VEHICLES
Filed Sept. 7, 1956 3 Sheets-Sheet 3

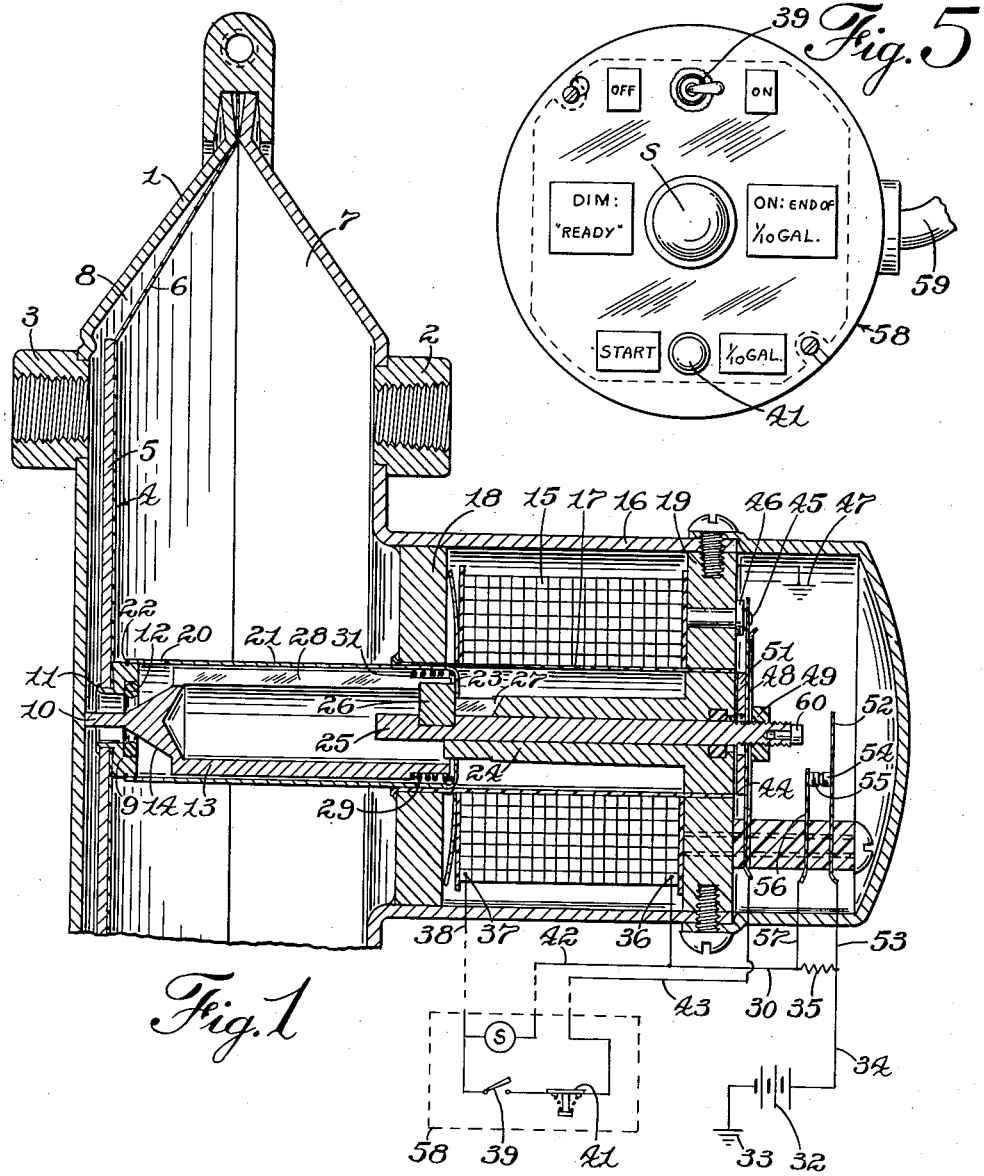

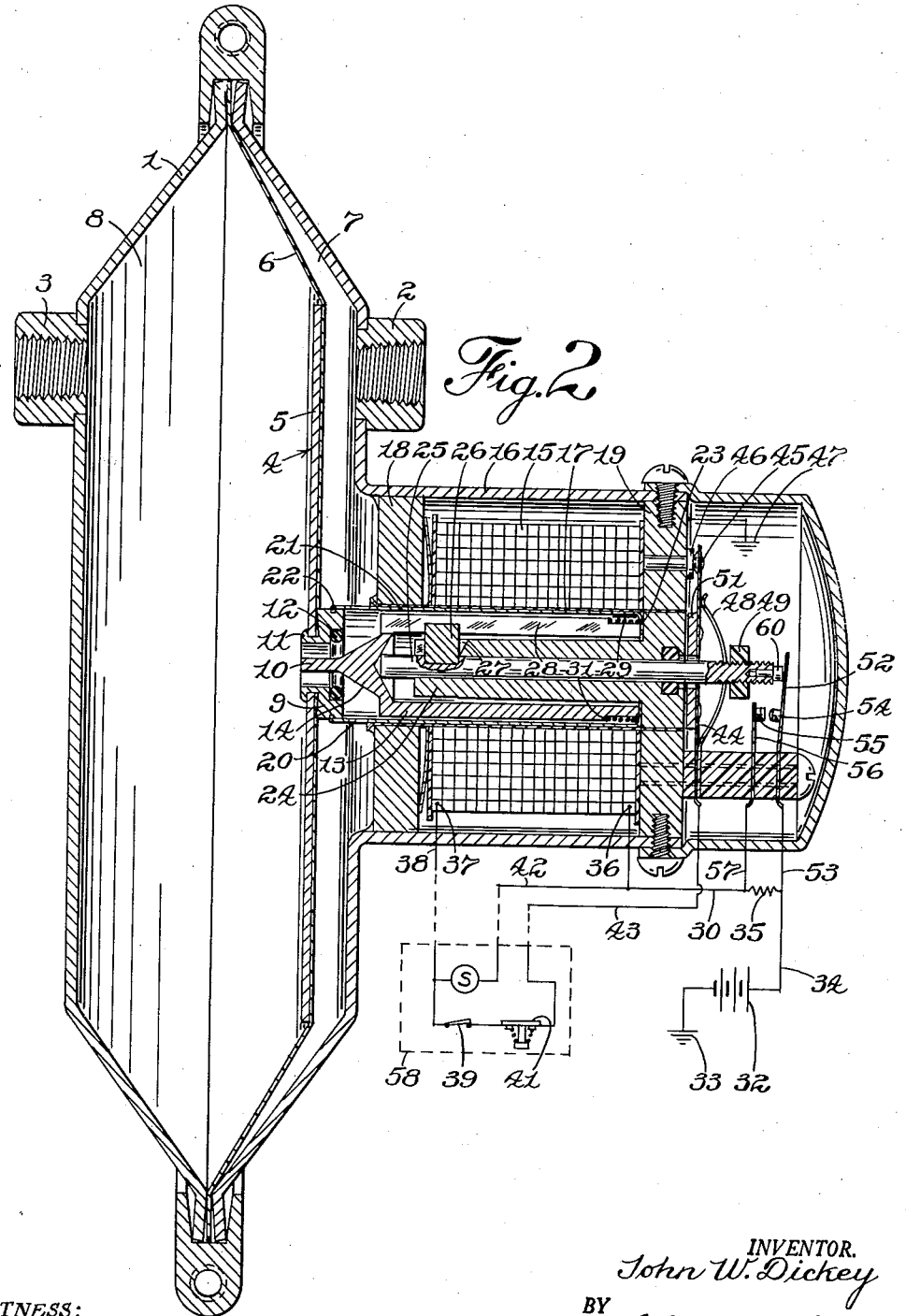

WITNESS:
Esther M. Stockton

INVENTOR.
John W. Dickey
BY
Clinton S. James
ATTORNEY

2,964,940

FUEL CONSUMPTION METER FOR AUTOMOTIVE VEHICLES

John W. Dickey, Ridgewood, N.J., assignor to The Bendix Corporation, a corporation of Delaware Filed Sept. 7, 1956, Ser. No. 608,512

8 Claims. (Cl. 73—113)

The present invention relates to a fuel consumption meter for automotive vehicles, and more particularly to a device for automatically actuating a signal when a predetermined volume of fuel has been fed to the engine.

It is an object of the present invention to provide a novel device of this character which is positive and reliable in operation, simple and economical in construction, and arranged to be used conveniently in conjunction with the usual odometer and speedometer of the vehicle to provide a miles-per-gallon meter for the vehicle on which it is installed.

It is another object to provide such a device which is triggered by the operator to place it in operation and which immediately resets itself automatically after each operation.

It is another object to provide such a device which does not interfere with the flow of fuel to the engine when idle or during the metering operation.

Further objects and advantages will be apparent from the following description taken in connection with the accompanying drawings in which:

Fig. 1 is a sectional view of a preferred embodiment of the invention, the electrical circuit being shown semi-diagrammatically, the parts being shown in idle position;

Fig. 2 is a view similar to Fig. 1 showing the parts in their positions when the device is ready to be triggered to start the metering operation;

Fig. 5 is an elevation of a convenient form of control box adapted to be mounted on the dash of the vehicle.

Figures 3, 4:
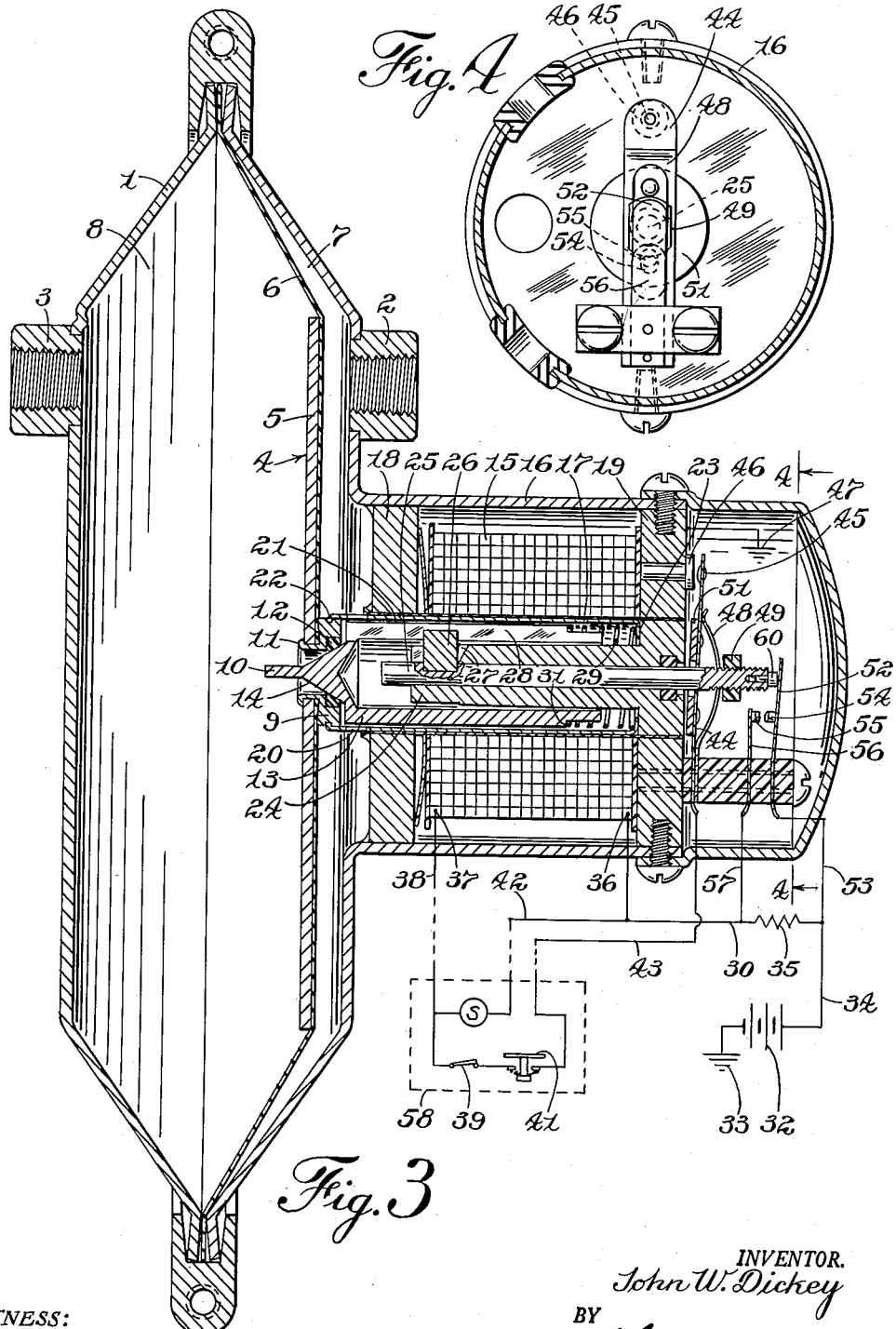
Fig. 3 is a similar view showing the parts at the start of the metering operation.
Fig. 4 is a section taken substantially on the line 4—4 of Fig. 3.

In Fig. 1 of the drawing there is illustrated a casing 1 having an inlet fitting 2 and an outlet fitting 3, and a movable partition 4 comprising a plate 5 and a flexible diaphragm 6 which divides the interior of the casing 1 into an inlet chamber 7 and an outlet chamber 8.

The partition 4 is provided with a central opening in which a valve seat member 9 is sealed in any suitable manner as indicated at 11. The seat member 9 has a sealing ring 12 fixed thereto, and a valve plunger 13 of magnetic material, having a tapered surface 14 for engagement with the seat 12 and a stem 10 extending through and beyond said seat, is mounted for axial movement into and out of engagement with the valve seat to control the passage of fuel from the inlet chamber 7 to the outlet chamber 8.

Means for actuating the valve plunger 13 is provided comprising a solenoid 15 mounted in a housing 16 attached centrally to the side of the inlet chamber 7 and having a non-magnetic cylindrical liner 17 fixed between annular pole pieces 18, 19 rigidly mounted in said housing. A tube 21 of non-magnetic material is attached at one end to the valve seat 9 as indicated at 22, and at its other end has a sliding telescopic bearing in the liner 17 of the solenoid. The tube 21 serves as a bearing for the magnetic plunger 13, and at its free end has an inturned flange 23 which overlaps the end of said plunger. Openings 20 in said tube permit flow of fuel from the inlet chamber to the interior of the tube.

A magnetic core member 24 is fixedly mounted in the pole piece 19 in any suitable manner and has slidably mounted therein a contact actuating rod 25. The core member is preferably tapered slightly as shown to secure a suitable "force curve," that is a suitable magnetic attraction throughout the stroke of the plunger 13. Rod 25 has fixedly mounted thereon a blade or finger 26 which extends radially through a slot 27 in the core 24 and is also slidable in a slot 28 in the magnetic plunger 13. The blade 26 is positioned to be engaged by the flange 23 of the tube 21 when the partition 4 approaches the end of its movement away from the inlet chamber 7, whereby such movement is imparted to the rod 25. Movement of the rod 25 in the opposite direction is brought about by engagement of the end of said rod in the bottom of the opening in the magnetic plunger 13 as the partition 4 approaches the end of its movement toward the inlet chamber 7.

A spring 29 between the flange 23 and a shoulder 31 on the plunger 13 urges the plunger toward its closed position against the valve seat 9.

Means is provided for energizing the solenoid 15 to attract the plunger away from the valve seat 9 and thereafter to draw the partition 4 toward the inlet chamber 7. As here shown this means comprises a battery 32 which is grounded at 33 and connected by a lead 34 through a resistor 35 and lead 30 to one terminal 36 of the solenoid. The opposite terminal 37 of the solenoid is connected by a lead 38 to a control panel comprising on-off switch 39, a normally closed push button switch 41 and a signaling device S of any suitable character such as a lamp bulb. The signal is connected by a lead 42 through lead 30 and resistor 35 to the battery lead 34. The push button switch is connected by a lead 43 to a spring blade 44 mounted on the pole piece 19 but insulated therefrom, and having at its free end a contact 45 adapted to engage a contact 46 mounted in said pole piece. The pole piece is grounded as indicated at 47 to complete the electrical circuit.

The contact blade 44 is tensioned to normally hold the contact 45 out of engagement with contact 46 as shown in Fig. 3 of the drawing. This contact blade is arranged to straddle the rod 25, and a spring 48 which is perforated to loosely receive the rod 25 is adapted to be engaged by a nut 49 threaded on said rod to transmit movement of the rod to the left through the spring 48 to close contacts 45, 46. The nut 49 is formed of insulating material in order to avoid grounding the spring 48 and consequently the contact blade 44.

Means for holding contacts 45, 46 closed during energization of the solenoid 15, irrespective of the position of the rod 25, is provided in the form of an annular armature 51 attached in any suitable manner to the contact blade 44 adjacent the end of the fixed core 24 of the solenoid.

The resistor 35 is of such value as to reduce the current flowing therethrough to a mere holding value for the solenoid but insufficient to cause actuation of the magnetic plunger 13. Means for short circuiting the resistor 35 to cause actuation of said plunger is provided comprising a spring blade 52 connected by a lead 53 to the battery lead 34 and having a contact 54 normally engaging a contact 55 on a blade member 56 which is connected by a lead 57 to form a shunt circuit around the resistor 35. The blade 52 extends into the path of the rod 25, whereby movement of the rod to the right will cause a button 60 of insulating material on the end of the rod to engage the blade and open contacts 54, 55 as shown in Fig. 3.

The leads 38, 42 and 43 running to the control panel are preferably cabled as indicated by the dotted lines and the panel is enclosed in a control box 58 mounted for convenient manipulation and observation by the operator. The control box is preferably arranged as shown in Fig. 5 with the on-off switch 39 located at the top, the signal device S in the middle, and the triggering push button 41 at the bottom, the cable connection being indicated at 59.

In use, the metering device is inserted in any convenient place in the fuel line for the engine, and the electrical connections made to the battery and control box. The switch 39 being opened, the parts assume the positions shown in Fig. 1 with the partition 4 at the end of its travel toward the outlet chamber as determined by the engagement of the flange 23 of the tube 21 with the blade 26 on the rod 25, the travel of which is limited by the flattening of the contact closing spring 48 against the contact blade 44. At this time, the valve plunger 13 is held away from the valve seat 9 by the engagement of its stem 10 with the wall of the casing 1, as shown in Fig. 1, thereby permitting the fuel to flow freely through openings 20 in the tube 21 and thus pass from the inlet chamber 7 through the valve to the outlet chamber 8. Contacts 45, 46 are held closed by the pressure of the nut 49 on rod 25, and contacts 54, 55 are permitted to close by the withdrawal of the rod 25.

When it is desired to run a mileage test, the operator closes the on-off switch 39 whereupon the solenoid 15 is energized by the full battery voltage passing through lead 34, contacts 54, 55 leads 57 and 30, solenoid 15, lead 38, switches 39, 41, lead 43, and contacts 45, 46 to the ground at 47. The plunger 13 is thereby drawn to the right, pulling the partition 4 with it by means of the flange 23 on the tube 21. When the plunger 13 engages the end of the rod 25 as shown in Fig. 2, said rod is moved to the right, relaxing the contact spring 48 and bending back the blade 52 to open contacts 54, 55. This inserts the resistance 35 in the solenoid circuit, but permits sufficient current to flow to hold the contacts 45, 46 closed by the magnetic attraction of the armature, and also to hold the plunger 13 away from the valve seat 9 against the force of the valve closing spring 29. At the same time the resistor 35 dims the signal lamp S, thus indicating to the operator that the device is ready for a metering operation.

In order to run a test, the operator reads the mileage on the speedometer and at the same time momentarily presses the push button 41 to open the battery circuit. This immediately permits the valve plunger 13 to engage its seat 9 as shown in Fig. 3, and at the same time permits the contact 45 to disengage the contact 46 thus opening the battery circuit and extinguishing the signal lamp S. As fuel is used from the outlet chamber 8, the partition 4 will move to the left until the flange 23 of the tube 21 engages the blade 26 on rod 25, thus moving the rod to the left until the pressure of the nut 49 on spring 48 closes contacts 45, 46. When this happens, the light S is lit brightly, which signals the operator to again take the mileage reading of the speedometer.

It will be understood that the travel of the partition 4 is so regulated that its working stroke corresponds to the delivery of a measured quantity of fuel such as one-tenth of a gallon. The length of the stroke is calibrated by adjustment of the nut 49 on rod 25 which determines the end of the discharging stroke.

When contacts 45, 46 are thus closed, the solenoid 15 is again energized to place the device in readiness for a further test. When it is not desired to make further tests the operator opens the on-off switch 39, whereupon the solenoid and signal are deenergized and the partition 4 permitted to travel to the left beyond the position where contacts 45, 46 are initially closed. This overtravel of the partition is permitted by the flattening of the spring 48, and accomplishes the opening of the bypass valve by engagement of the stem 10 of the valve plunger 13 with the wall of the casing 1 prior to the final discharge movement of the partition 4 whereby the parts again assume their positions as shown in Fig. 1.

Although but one embodiment of the invention has been shown and described in detail it will be understood that changes may be made in the precise form and arrangement of the parts without departing from the spirit of the invention.

I claim:

1. A manually controlled volumetric device for automatically signalling the passage of a predetermined quantity of liquid therethrough comprising a casing, a movable partition in the casing dividing it into an inlet chamber and an outlet chamber, said partition having a passage therethrough and a valve seat surrounding said passage, a valve member in the inlet chamber cooperating with the valve seat to control said passage, yielding means urging the valve member toward its seat to close said passage, connecting means attached to said partition positively limiting the movement of the valve member away from the partition, electromagnetic means under the control of the operator for drawing the valve member away from its seat and thereafter drawing the partition toward the inlet chamber by said connecting means while holding the valve member away from its seat, means under the control of the operator for deenergizing said electromagnetic means, and means for actuating a signal responsive to a predetermined return movement of said partition.

2. A volumetric device as set forth in claim 1 including also means for reactivating the electromagnetic drawing and holding means simultaneously with the actuation of said signal.

3. A volumetric device as set forth in claim 2 including also means independent of said electromagnetic drawing and holding means for opening said valve by final return movement of the partition.

4. A volumetric device as set forth in claim 1 in which said electromagnetic drawing and holding means includes a magnetic plunger, a solenoid for actuating the plunger, and an electrical circuit for energizing the solenoid including a manually operable switch.

5. A volumetric device as set forth in claim 4 in which said electrical circuit includes a pair of normally open contacts, and means actuated by a predetermined return movement of the partition to close said contacts.

6. A volumetric device as set forth in claim 5 including also means actuated by said solenoid for holding said contacts closed.

7. A volumetric device as set forth in claim 5 including also means responsive to further return movement of the partition, after closure of said contacts, to open said valve.

8. A volumetric device as set forth in claim 4 including also a resistor in said electrical circuit of such value as to reduce the flow of current through the solenoid to a holding value only, a shunt for bridging the resistor including a pair of normally closed contacts, and means responsive to final movement of the partition toward the inlet chamber for opening said contacts.

References Cited in the file of this patent.

UNITED STATES PATENTS

| | | |
|---|---|---|
| 90,123 | Poore | May 18, 1869 |
| 488,504 | Knickerbocker | Dec. 20, 1892 |
| 1,589,068 | Givens | June 15, 1926 |
| 1,592,707 | Rippingille | July 13, 1926 |